United States Patent [19]

Wu

[11] Patent Number: 5,465,930
[45] Date of Patent: Nov. 14, 1995

[54] GOLF BAG CRADLE ASSEMBLY

[76] Inventor: Ching-Chang Wu, No. 35-1, Jih Hsin Street, Tu Cheng Hsiang, Taipei Hsien, Taiwan

[21] Appl. No.: 216,318

[22] Filed: Mar. 23, 1994

[51] Int. Cl.[6] .................................. A63B 55/00
[52] U.S. Cl. .......................... 248/96; 24/484
[58] Field of Search ...................... 248/96, 311.2, 248/313; 24/68 D, 68 R, 484, 20 TT, 301; 403/289, 341

[56] References Cited

U.S. PATENT DOCUMENTS

| | | | |
|---|---|---|---|
| 3,603,540 | 9/1971 | Gouge | 248/96 |
| 3,610,559 | 10/1971 | Leitzel | 248/96 |
| 4,620,682 | 11/1986 | Yim | 248/96 |
| 4,912,813 | 4/1990 | Müller et al. | 24/68 R X |
| 5,016,325 | 5/1991 | Rasmussen | 24/68 R |

Primary Examiner—Ramon O. Ramirez
Assistant Examiner—Derek J. Berger
Attorney, Agent, or Firm—Varndell Legal Group

[57] ABSTRACT

A golf bag cradle assembly includes a bag cradle having two upright posts in two recessed holes thereof and two side slots on two opposite ends thereof respectively communicated with either recessed hole, two straps having a respective rear end terminating in a loop mounted around either upright post and a respective front end extended out of either side slot on the bag cradle and coupled with a male or female strap connector for fastening a golf bag to the bag cradle, and two plug caps fastened to either recessed hole by a respective hook to hold the loop of either strap to the respective upright post.

2 Claims, 4 Drawing Sheets

GOLF BAG CRADLE ASSEMBLY

BACKGROUND AND SUMMARY OF THE INVENTION

The present invention relates to a golf bag cradle assembly which is easy to assemble and inexpensive to manufacture.

A golf cart generally comprises a first bag cradle with a cradle strap and a second bag cradle with a cradle strap respectively mounted on the frame member thereof for carrying a golf bag. The first bag cradle comprises four through holes and a middle hole. The strap body of the cradle strap has one end coupled with a strap connector, and an opposite end inserted through the four through holes and passed over the recessed hole and then inserted through two locating holes on the strap connector to hold down the golf bag. One drawback of this structure of bag cradle is the complicated installation procedure of the cradle strap. Another drawback of this structure of bag cradle is that the formation of the through holes and the recessed hole on the frist bag cradle requires a complicated molding tool to complete, and therefore the manufacturing cost of the first bag cradle is high.

The present invention has been accomplished to provide a golf bag cradle assembly which eliminates the aforesaid drawbacks. According to the preferred embodiment of the present invention, the golf bag cradle assembly comprises a bag cradle having two upright posts in two recessed holes thereof and two side slots on two opposite ends thereof respectively communicated with either recessed hole, two straps having a respective rear end terminating in a loop mounted around either upright post and a respective front end extended out of either side slot on the bag cradle and coupled with a male or female strap connector for fastening a golf bag to the bag cradle, and two plug caps fastened to either recessed hole by a respective hook to hold the loop of either strap to the respective upright post. Simply by hanging the loop of either cradle strap on either upright post and then hooking the hook of either plug cap on either retaining hole, each cradle strap is installed, and therefore the assembly process of the invention is simple.

DETAILED DESCRIPTION OF THE PREFERRED EMBODIMENT

Figure 1:
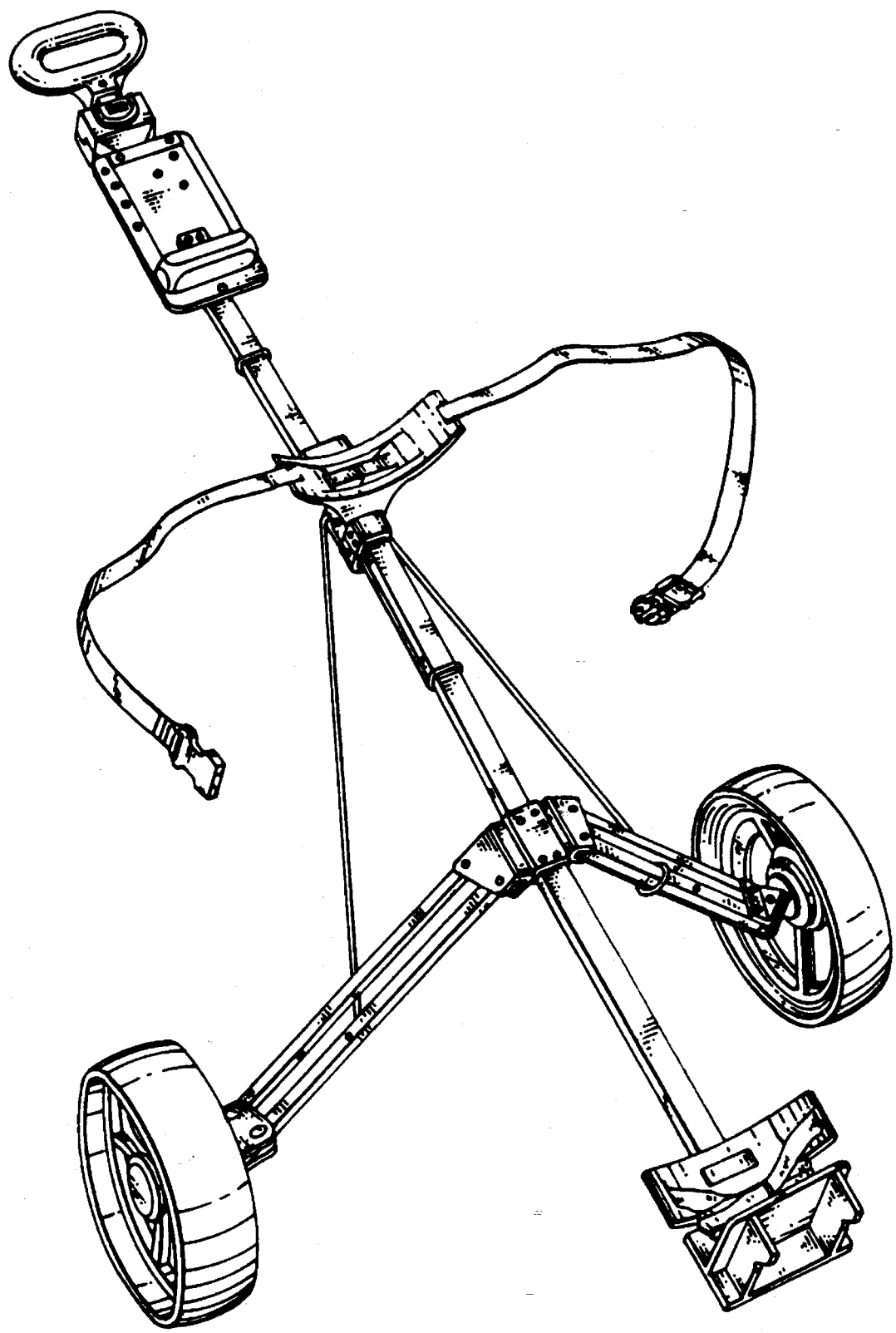
FIG. 1 is an elevational view of a golf cart having golf bag cradles made according to the prior art.
Figure 2:
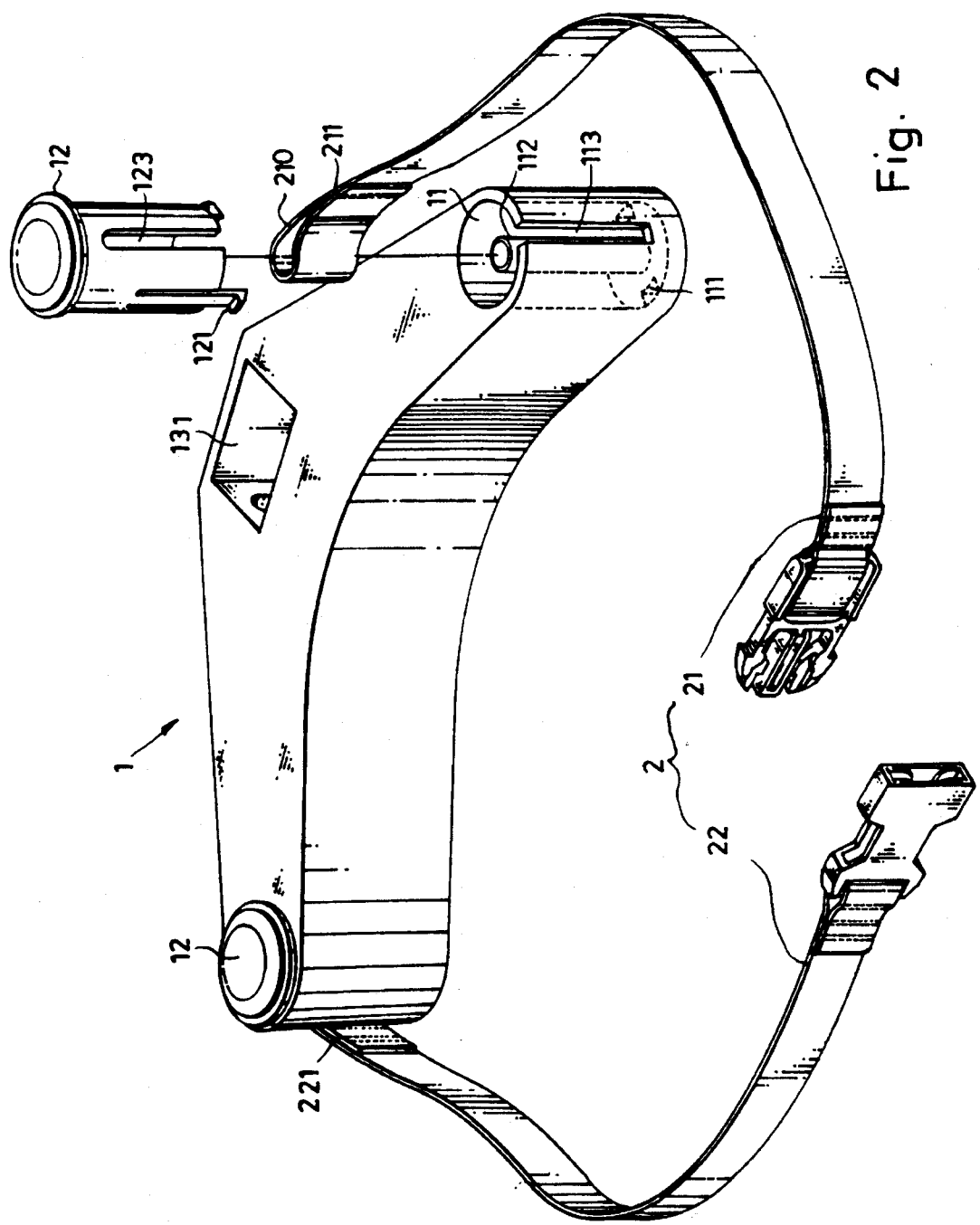
FIG. 2 is an exploded view of a golf bag cradle assembly according to the preferred embodiment of the present invention.
Figure 3:
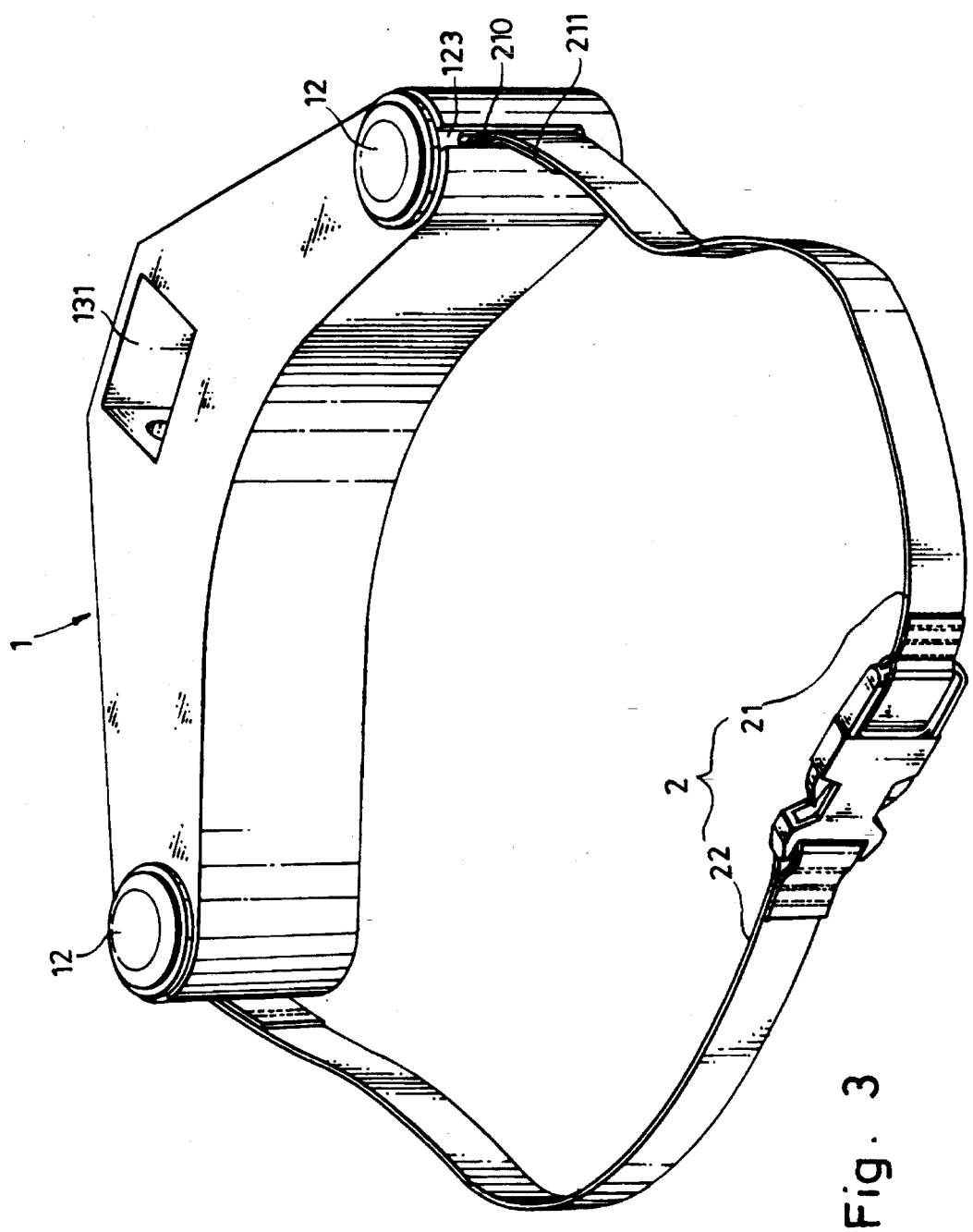
FIG. 3 is an elevational view of the golf bag cradle assembly shown in FIG. 2.
Figure 4:
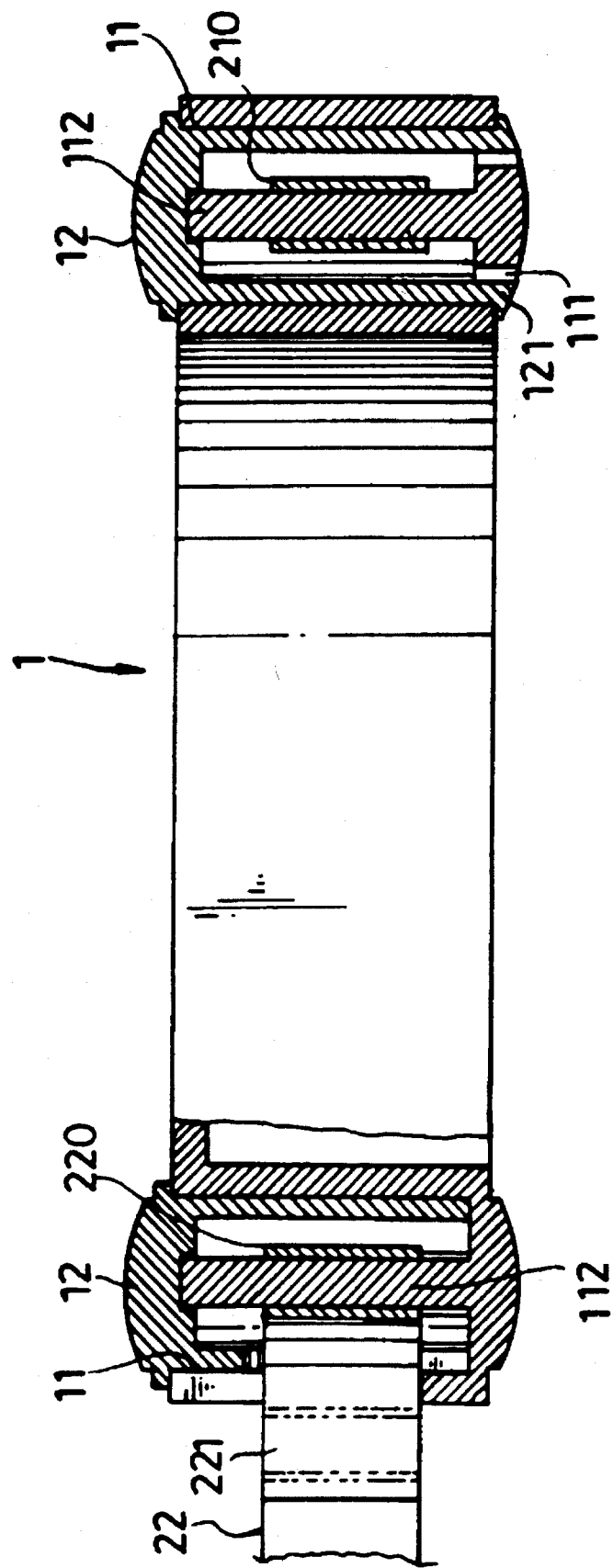
FIG. 4 is a sectional view of the golf bag cradle assembly shown in FIG. 3.

Referring to FIGS. 2, 3, and 4, a golf bag cradle, comprises a mounting through hole 131 in the middle, which receives the frame member of the golf cart, a screw hole on the back (not shown), into which a tihgtening up screw (not shown) is threaded and stopped against the frame member of the golf cart to fix the upper bag cradle to the frame member of the golf cart, two recessed, cylindrical strap mounting holes 11 disposed on two opposite ends thereof in the axial direction in parallel with the frame member of the golf cart, and two hollow, cylindrical plug caps 12 respectively fastened to the strap mounting holes 11 to hold two straps 2. The strap mounting hole 11 at either end of the golf bag cradle 1 comprises an elongated side slot 113 extended through the peripheral wall of the golf bag cradle 1 to the outside, an upright post 112 raised from the bottom on the inside in the center, and a retaining hole 111 on the bottom spaced from the upright post 112. The hollow, cylindrical plug cap 12 comprises a hook 121 at the bottom hooked in the retaining hole 111 inside either strap mounting hole 11, a side slot 123 disposed in parallel with the elongated side slot 113. The straps 2 have a respective rear end 211 or 221 terminating in a loop 210 or 220, which is mounted around the upright post 112 in either strp mounting hole 11, and a respective front end extended out of the respective plug cap 12 and either end of the golf bag cradle 1 through the respective side slots 123 and coupled with a male connector 21 or female connector 22. When the golf bag is placed on the golf bag cradle 1, the male and female connectors 21; 22 of the straps 2 are fastened together to hold down the golf bag.

I claim:

1. A golf bag cradle assembly comprising a golf cart with a frame member, a golf bag cradle having two ends and mounted around said frame member of said golf cart, two straps for securing a golf bag to said golf bag cradle, two plug caps respectively fastened to said two ends of said golf bag cradle respectively holding said two straps in place, said golf bag cradle including two recessed strap mounting holes respectively receiving said plug caps and arranged at two opposite locations in an axial direction parallel with said frame member of said golf cart; each said mounting hole including an elongated side slot providing said mounting hole with an opening extending outside of said golf bag cradle, a center including an upright post, and a bottom with a retaining holes, each said plug cap including a bottom with a hook hooked in said retaining hole of a respective said mounting hole, a peripheral wall surrounding a respective said upright post, a top over a respective said upright post, and a side slot disposed in parallel with a respective elongated side slot on said golf bag cradle; and each said strap having a rear end terminating in a loop mounted around a respective said upright post, and a front end extending out of a respective said elongated side slot of said mounting holes and coupled with a strap connector.

2. A golf bag cradle assembly comprising a golf bag cradle having two ends for mounting around a frame member of a golf cart, two straps for securing a golf bag to said golf bag cradle, two plug caps respectively fastened to said two ends of said golf bag cradle respectively holding said two straps in place, said golf bag cradle including two recessed strap mounting holes respectively receiving said plug caps and arranged at two opposite locations; each said mounting hole including an elongated side slot providing said mounting hole with an opening extending outside of said golf bag cradle, a center including an upright post, and a bottom with a retaining holes, each said plug cap including a bottom with a hook hooked in said retaining hole of a respective said mounting hole, a peripheral wall surrounding a respective said upright post, a top over a respective said upright post, and a side slot disposed in parallel with a respective elongated side slot on said golf bag cradle; and each said strap having a rear end terminating in a loop mounted around a respective said upright post, and a front end extending out of a respective said elongated side slot of said mounting holes and coupled with a strap connector.

* * * * *